Dec. 4, 1923.
J. R. BINGHAM
1,476,139
FISHING BAIT
Filed Sept. 23, 1920
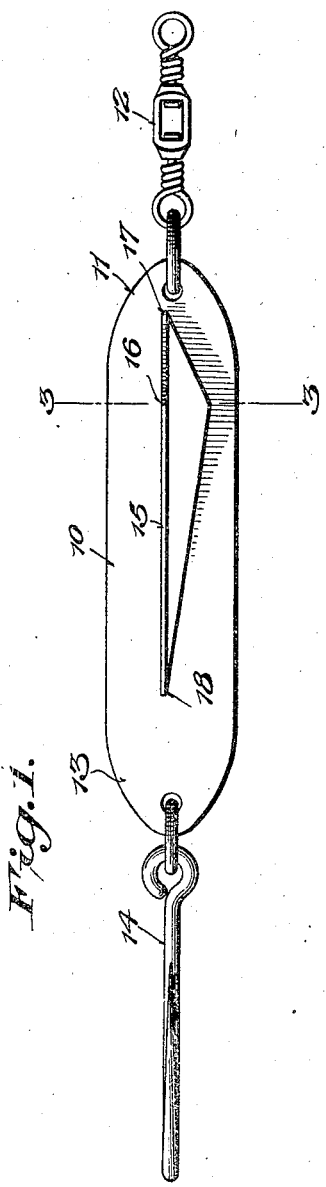
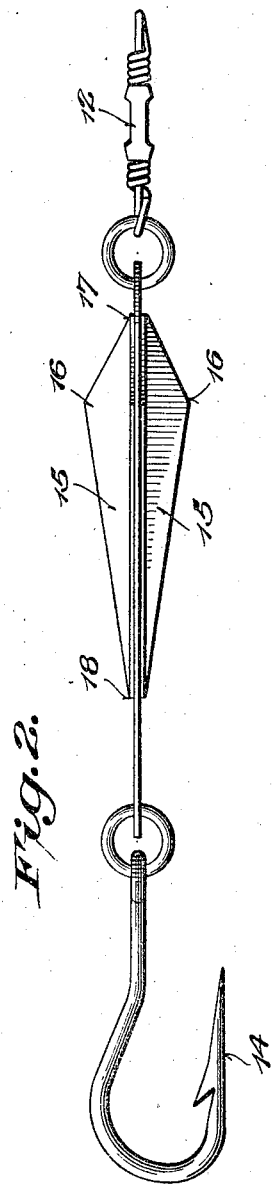
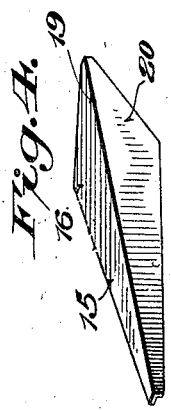
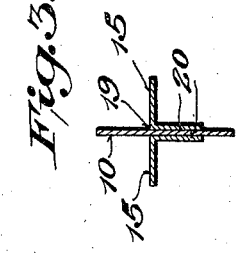
Inventor
John R. Bingham
WITNESS:—

Patented Dec. 4, 1923.

1,476,139

UNITED STATES PATENT OFFICE.

JOHN R. BINGHAM, OF TACOMA, WASHINGTON.

FISHING BAIT.

Application filed September 23, 1920. Serial No. 412,157.

*To all whom it may concern:*

Be it known that I, JOHN R. BINGHAM, a citizen of the United States, residing at Tacoma, in the county of Pierce and State of Washington, have invented new and useful Improvements in Fishing Bait, of which the following is a specification.

My invention relates to improvements in artificial fishing bait, and deals more particularly with that class of bait commonly known as a "non-spinning spoon".

The primary object of my invention is to provide an artificial bait which will resemble the outline of a small fish, both in its general form and action in the water.

Another object of the invention is to prodive an artificial bait which is very simple in construction and consequently durable and inexpensive to manufacture.

The above, and other objects of the invention of a more obvious character which will become apparent as the description proceeds, are obtained by the provision of a bait comprising an elongated thin sheet of metal or other suitable material having fins running longitudinally thereof and extending laterally from each face so as to rest upon the water. Each of the fins is constructed so as to taper toward each end from a medial point, whereby the two fins together throw a shadow in the water resembling a small fish, and is of less width than the body formed by the sheet of metal in order to permit an oscillatory motion of the body plate about its longitudinal center as an axis. The fins are widest at the front end of the body in order to give greater buoyancy to that end and to cause the lure to rise in the water.

In the accompanying drawings:—

Fig. 1 is a side elevational view,

Fig. 2 is a top plan view,

Fig. 3 is a cross section taken on the line 3—3 of Fig. 1, and

Fig. 4 is a perspective of one of the fins before it is attached to the body plate.

Referring to the drawings more in detail, 10 indicates an elongated body, which, in the present instance, is formed of thin metal and the ends of which are rounded so as to give a generally attractive appearance to the device. At the head 11 of the plate is secured the swivel 12 which serves to connect the trolling line to the body plate, and at the tail 13 is connected the hook 14.

From each face of the body plate laterally extends a fin 15 which runs longitudinally on the plate for substantially its entire length. The fins should preferably be constructed so as to taper in width from a medial point, as at 16, toward their ends 17, 18, the taper toward the head end 17 being more sharp than the gradual taper toward the tail end 18. It will be noted that when thus constructed the two fins together resemble the outline of a fish and together are of considerably less width than the body plate. Moreover, it will be noted that the fins are broadest at the forward end of the body plate, thereby giving greater buoyancy to that end of the plate and causing the lure to rise in the water. These fins may be formed in any suitable manner, and in the present instance are shown as constructed of separate pieces of metal bent along their longitudinal centers 19 to form the laterally extending fin portions 15 and the downwardly plate-paralleling securing faces 20. The fins may be secured to the body plate by welding the faces 20 thereto or in any other manner found to be convenient. It will also be noted that the fins extend laterally from the body plate in a plane at right angles to the faces of the plate and thus are adapted to rest with their under surfaces upon the water.

In operation the bait is drawn through the water by the trolling line, the bait being in the position shown in Fig. 1 with the under surfaces of the fins resting upon the water and the body plate resting edgewise on the water. As the bait is pulled through the water the fins cause the plate to wobble slightly from side to side, but prevent the plate from rotating. Thus the bait takes the darting motion common to small fish, and hence affords a bait very attractive to the larger fish.

It will be understood that the device shown in the accompanying drawings and herein described in detail is not restrictive of my invention, but merely illustrative, it being representative of but one of many forms in which the invention could be embodied. Many modifications could readily be made in the illustrated embodiment of my invention without departing from its scope, as more definitely defined in the following claim.

What I claim is:—

An artificial fish bait comprising a relatively narrow elongated body, a pair of substantially flat fins extending laterally from opposite faces of said body and running longitudinally thereof, each fin tapering in width from a medial point adjacent the forward end of the body toward each end thereof, the forward taper being considerably sharper than the rearward taper and the fins being shorter and of substantially less width than the body whereby oscillatory motion of the body without rotation is permitted, and said fins being wider adjacent the forward end of the body so as to impart a greater buoyancy thereto at its front end to cause the lure to rise in the water.

In testimony whereof I have hereunto set my hand.

JOHN R. BINGHAM.